7482X
R. Walker,
Water Wheel,
Patented Mar. 12, 1833.
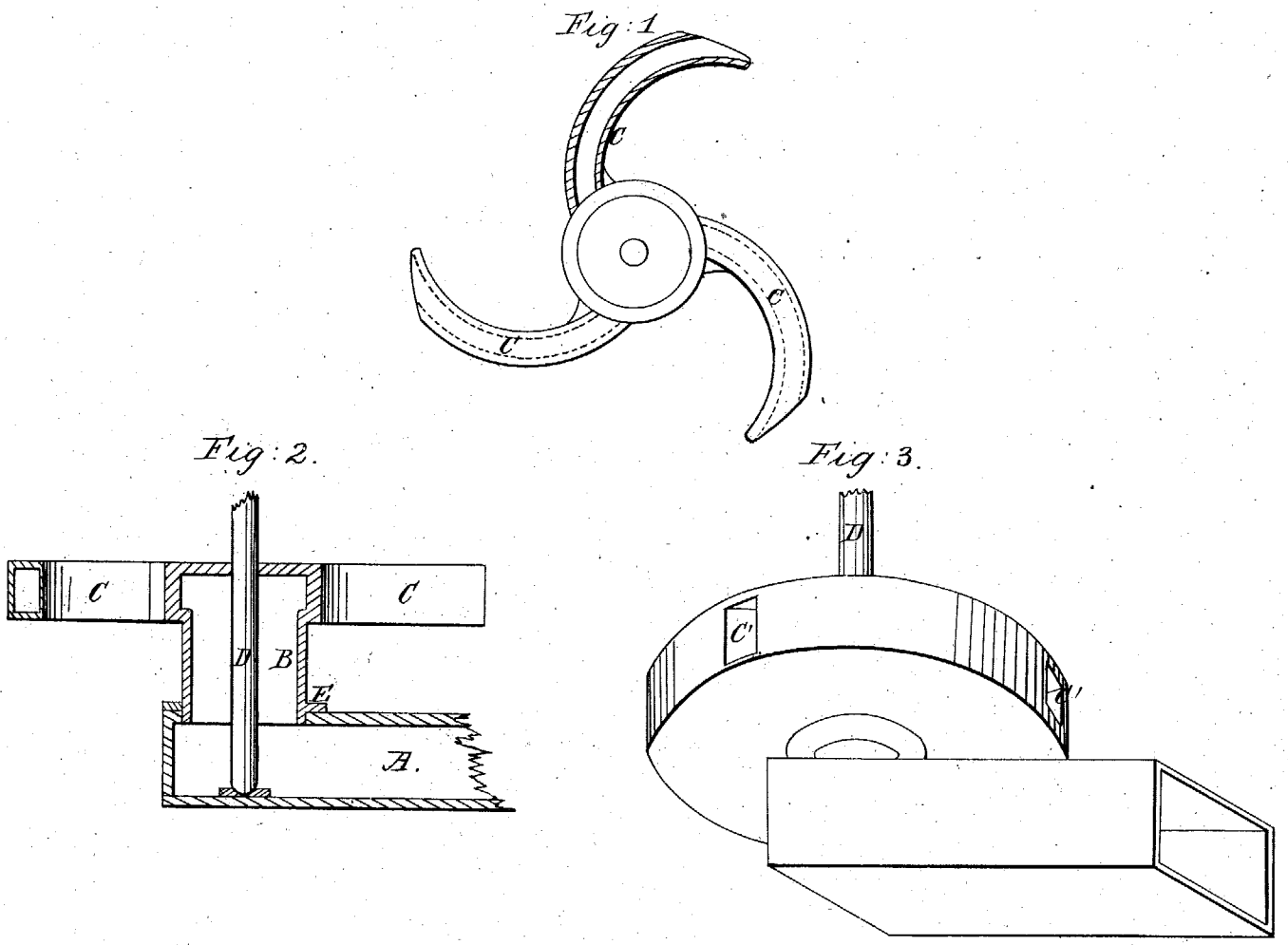
N. PETERS, PHOTO-LITHOGRAPHER, WASHINGTON, D. C.

7482X

Mar. 12, 1833 20

Richard Walker
Letters Patent

The Schedule referred to in these Letters Patent and making part of the same containing a description in the words of the said Richard Walker himself of his improvement in the construction of Water Wheels & applying Water thereto.

To all to whom these presents shall come
Be it known that I Richard Walker of Milton in the County of Strafford & State of Newhampshire have invented a new & useful improvement in the construction of Water Wheels & in the application of Water to the wheel & that the following is a full & exact description of the construction & operation of the said Wheel as invented by me.
The wheel represented by the drawing & Model is six feet in diameter one foot thick with an iron shaft four inches in diameter this shaft is to stand perpendicular on a pivot in the bottom of the conductor. From the centre of the wheel around the shaft extends a cast hollow cylinder downwards into the conductor upon the top of which is to be a circular plate thro' which the cylinder passes so as to make it water tight. The cylinder about one foot in diameter with the lower end open receives the water as it is forced from the conductor & conducts it into the centre of the wheel. From the centre of the wheel the water is forced out at the rim thro' three semicircular buckets or hollow arms to the opposite parts of the rim. The buckets or winding outlets are three inches wide by nine deep making the column of water passing thro' the wheel nine inches square. The sweep of the inside of said buckets arms or outlets is the sweep of the semidiameter of the wheel & the continual pressure of water on the outer circle gives the wheel its motion. Further said wheel may be built of either wood or cast iron & when built for tide water is to present an entire smooth surface excepting the outlets in the rim & will work as well under water as out of water but may be made for ordinary purposes with only hollow semicircular arms. Further Drawing 7482x Mar. 12, 1833

I contemplate varying the size of said wheel from two feet to twenty six in proportion to the space required & to vary the size and number of buckets from two to ten in proportion to the strength required. The principle I claim as my invention is the taking in the water on the under side of the wheel with an upward bearing by which the wheel is relieved of its own specific gravity to the full amount of the force of the column taken in & the construction of the wheel to make the water act with full force from the centre outward on every part alike at one & the same time thro said buckets or semicircular outlets by which the wheel gains its motion Witnesses
Wm B. Wiggin
Thos Ackerman Richard Walker Exd.
W.G.

[illegible]